(12) United States Patent
Cabillic et al.

(10) Patent No.: US 7,930,689 B2
(45) Date of Patent: Apr. 19, 2011

(54) METHOD AND SYSTEM FOR ACCESSING INDIRECT MEMORIES

(75) Inventors: Gilbert Cabillic, Brece (FR); Jean-Philippe Lesot, Estrelles (FR); Gerard Chauvel, Antibes (FR)

(73) Assignee: Texas Instruments Incorporated, Dallas, TX (US)

( * ) Notice: Subject to any disclaimer, the term of this patent is extended or adjusted under 35 U.S.C. 154(b) by 1422 days.

(21) Appl. No.: 11/186,271

(22) Filed: Jul. 21, 2005

(65) Prior Publication Data

US 2006/0026370 A1  Feb. 2, 2006

(30) Foreign Application Priority Data

Jul. 27, 2004  (EP) .................................... 04291918

(51) Int. Cl.
*G06F 9/44* (2006.01)
*G06F 12/06* (2006.01)
*G06F 9/26* (2006.01)

(52) U.S. Cl. .............................. 717/162; 711/2; 711/202

(58) Field of Classification Search .................. 717/108, 717/116, 165, 139, 319, 162
See application file for complete search history.

(56) References Cited

U.S. PATENT DOCUMENTS

| | | | | |
|---|---|---|---|---|
| 5,923,877 A | * | 7/1999 | Berner et al. | 717/108 |
| 6,003,038 A | * | 12/1999 | Chen | 707/103 R |
| 6,202,147 B1 | * | 3/2001 | Slaughter et al. | 713/1 |
| 6,725,345 B2 | * | 4/2004 | Baba et al. | 711/154 |
| 7,159,223 B1 | * | 1/2007 | Comeau | 719/310 |
| 7,328,436 B2 | * | 2/2008 | Perez | 717/178 |

* cited by examiner

*Primary Examiner* — Emerson C Puente
*Assistant Examiner* — Paul Mills
(74) *Attorney, Agent, or Firm* — Ronald O. Neerings; Wade James Brady, III; Frederick J. Telecky, Jr.

(57) ABSTRACT

Systems, methods, and storage media for accessing indirect memory in Java applications are provided. In some embodiments, a storage medium is provided that comprises Java application software that performs one or more operations on an indirect memory of a device. The software comprises instructions that create an instance of a Java class representing the indirect memory, and instructions that access a memory element of the indirect memory using an element unique identifier ("euid") of the memory element. Other embodiments provide a method for accessing memory elements of a device that comprises creating an instance of a Java class representing the memory elements, and accessing a memory element of the memory elements using an element unique identifier ("euid") of the memory element, wherein the memory elements are not mapped into the data memory space of the processor.

7 Claims, 4 Drawing Sheets

| 1 | Class IndirectMemory |
|---|---|
| 2 | { |
| 3 | public volatile char [ ] IndirectMemory; |
| 4 | static |
| 5 | { |
| 6 | mapArrayOn(memoryEuidBase); |
| 7 | } |
| 8 | } |
| 9 | |
| 10 | Class User |
| 11 | { |
| 12 | method Toto ( ) |
| 13 | { |
| 14 | char c; |
| 15 | indirectMemory=new IndirectMemory(); |
| 16 | c=indirectMemory[element1offset]; |
| 17 | indirectMemory[element2offset]=c+1; |
| 18 | } |
| 19 | } |

*FIG. 3*

| 1 | static native int Read (int portAddress) |
|---|---|
| 2 | { |
| 3 |     return (IN(portAddress)); |
| 4 | } |
| 5 | |
| 6 | static native void Write (int portAddress, char value) |
| 7 | { |
| 8 |     OUT (portAddress, value); |
| 9 | } |
| 10 | |
| 11 | Class IndirectMemory |
| 12 | { |
| 13 |     static native int Read (int portAddress); |
| 14 |     static native void Write (int portAddress,char value); |
| 15 | } |
| 16 | |
| 17 | Class User |
| 18 | { |
| 19 |     method Toto( ) |
| 20 |     {    char c; |
| 21 |     c=IndirectMemory.read(element1Euid);    //read indirect element1Euid |
| 22 |     IndirectMemory.write(element2Euid, c+1)    //write indirect element2Euid |
| 23 |     } |
| 24 | } |

FIG. 4

| 1 | Class IndirectMemory |
| --- | --- |
| 2 | { |
| 3 |     public volatile char element1; |
| 4 |     public volatile char element2; |
| 5 |     static |
| 6 |     { |
| 7 |         mapFieldOnport(element1,element1Euid); |
| 8 |         mapFieldOnport(element2,element2Euid); |
| 9 |     } |
| 10 | } |
| 11 | |
| 12 | Class User |
| 13 | { |
| 14 |     IndirectMemory indirectMemory; |
| 15 |     method Toto ( ) |
| 16 |     {    int c; |
| 17 |         indirectMemory=new IndirectMemory ( ); |
| 18 |         c=indirectMemory.element1;    //read indirect element1Euid |
| 19 |         indirectmemory.element2=c+1;    //write indirect element2Euid |
| 20 |     } |
| 21 | } |

| 1 | Class IndirectMemory |
|---|---|
| 2 | { |
| 3 | public volatile char [ ] IndirectMemory; |
| 4 | static |
| 5 | { |
| 6 | mapArrayOn(memoryEuidBase); |
| 7 | } |
| 8 | } |
| 9 | |
| 10 | Class User |
| 11 | { |
| 12 | method Toto ( ) |
| 13 | { |
| 14 | char c; |
| 15 | indirectMemory=new IndirectMemory(); |
| 16 | c=indirectMemory[element1offset]; |
| 17 | indirectMemory[element2offset]=c+1; |
| 18 | } |
| 19 | } |

METHOD AND SYSTEM FOR ACCESSING INDIRECT MEMORIES

CROSS-REFERENCE TO RELATED APPLICATIONS

This application claims the benefit of European Patent Application No. 04291918.3, filed Jul. 27, 2004, incorporated by reference herein as if reproduced in full below.

BACKGROUND OF THE INVENTION

Mobile electronic devices such as personal digital assistants (PDAs) and digital cellular telephones increasingly include applications written in the Java™ programming language. As they execute, these applications may need to access memory in one or more components of a mobile electronic device that is not mapped into the data memory space of the processor or processors executing the application, i.e., memory that is not addressable using load/store based instructions of the processor executing the applications. Such memory may be referred to as indirect memory. Examples of indirect memory include input/output ("I/O") device memory, memory on a flash memory card, disk devices and non-addressable memory banks.

The elements of an indirect memory are accessed using a sequence of instructions that use other data, i.e., metadata, which uniquely identifies the element. This metadata, referred to herein as an element unique identifier ("euid"), may be defined by the system configuration of the mobile electronic device. The instruction sequences and the euid vary in size and complexity. For example, if the indirect memory is I/O device memory, the euid may be an I/O port address assigned to the I/O device in the system configuration and the code sequence to perform a read or a write may be a single instruction provided by a processor (e.g., IN or OUT on Intel processors). If the indirect memory is a disk device, the euid identifying an element may include a disk identifier, a disk directory, a file name, a sector identifier, and an offset into the sector, and the code sequence to read or write a disk element is more complex. Enhancements to permit ease of programming indirect memory accesses in Java are desirable.

SUMMARY

Accordingly, there are disclosed herein methods and systems for accessing indirect memories in Java applications. Some embodiments provide a storage medium that comprises Java application software that performs one or more operations on an indirect memory of a device. The software comprises instructions that create an instance of a Java class representing the indirect memory, and instructions that access a memory element of the indirect memory using an element unique identifier ("euid") of the memory element.

In other embodiments, a method for accessing memory elements of a device from Java application software executing on a processor is provided. The method comprises creating an instance of a Java class representing the memory elements, and accessing a memory element of the memory elements using an element unique identifier ("euid") of the memory element, wherein the memory elements are not mapped into the data memory space of the processor.

Other embodiments provide a system that comprises a processor, a device coupled to the processor, the device comprising an indirect memory, a Java virtual machine that executes on the processor, and a Java application that executes on the Java virtual machine. An instance of a Java class is created to represent the indirect memory, and the Java application is configured to access a memory element of the indirect memory using an element unique identifier ("euid") of the memory element.

NOTATION AND NOMENCLATURE

Certain terms are used throughout the following description and claims to refer to particular system components. As one skilled in the art will appreciate, semiconductor companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

BRIEF DESCRIPTION OF THE DRAWINGS

For a more detailed description of the preferred embodiments of the present invention, reference will now be made to the accompanying drawings, wherein:

FIGS. 3, 4, and 5 show source code examples of methods in accordance with embodiments of the invention; and FIG. 6 depicts an illustrative embodiment of the system described herein.

DETAILED DESCRIPTION OF THE PREFERRED EMBODIMENTS

The following discussion is directed to various embodiments of the invention. Although one or more of these embodiments may be preferred, the embodiments disclosed should not be interpreted, or otherwise used, as limiting the scope of the disclosure, unless otherwise specified. In addition, one skilled in the art will understand that the following description has broad application, and the discussion of any embodiments is meant only to be exemplary of those embodiments, and not intended to intimate that the scope of the disclosure is limited to those embodiments.

The subject matter disclosed herein is directed to methods for programming indirect memory accesses in Java. Merely by way of example, the embodiments described herein are directed to a Java Virtual Machine implemented on a Java processor referred to herein as a Java Stack Machine. These embodiments should not be construed as limitations of the scope of this disclosure. The methods described are applicable to implementations of the Java Virtual Machine on other processors including general purpose processors.

Figure 1:
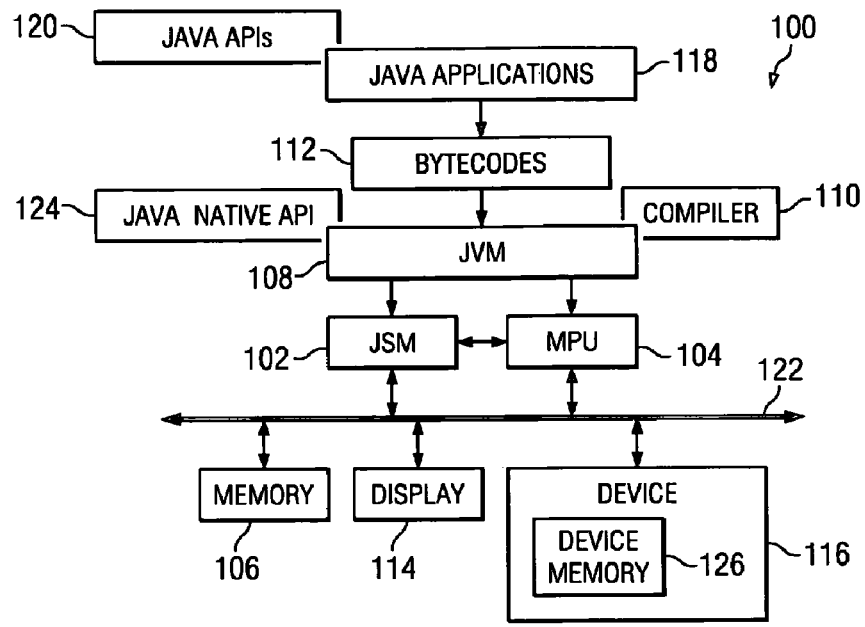
FIG. 1 shows a diagram of a system in accordance with embodiments of the invention.

FIG. 1 shows a system 100 in accordance with some embodiments of the invention. As shown, the system may comprise at least two processors 102 and 104. Processor 102 may be referred to for purposes of this disclosure as a Java Stack Machine ("JSM") and processor 104 may be referred to as a Main Processor Unit ("MPU"). System 100 may also comprise memory 106, a display 114, and device 116 coupled to both the JSM 102 and MPU 104 via one or more busses 122. At least a portion of the memory 106 may be shared by both processors, and if desired, other portions of the memory 106 may be designated as private to one processor or the other. The device 116 may be a device such as an input output device, a flash memory card, and a disk drive. The device 116 may comprise device memory 126 that is indirect memory, i.e., memory that is not mapped into the data memory space of the MPU 104 or the JSM 102. Euid's for the elements of the device memory 126 may be defined by the configuration of the hardware platform of the system 100 and symbolic representations of these euid's may be made available for use in the Java applications 118 that access the device memory 126. Other components (not specifically shown) may be comprised as desired for various applications.

System 100 also comprises a Java Virtual Machine ("JVM") 108, compiler 110, Java APIs 120, Java native APIs 124, and Java applications 118. The JVM may comprise a class loader, bytecode verifier, garbage collector, and a bytecode interpreter loop to interpret the bytecodes that are not executed on the JSM processor 102. The Java applications 118 are written in Java language source code and may comprise references to one or more classes of the Java Application Program Interfaces ("APIs") 120 and the Java native APIs 124. The Java native APIs 124 comprises interfaces to classes and methods implemented in other languages such as C++, C or assembler.

The Java source code is converted or compiled to a series of bytecodes 112, with each individual one of the bytecodes referred to as an "opcode." Bytecodes 112 are provided to the JVM 108, possibly compiled by compiler 110, and provided to the JSM 102 and/or MPU 104 for execution. In some embodiments, the JSM 102 may execute at least some Java bytecodes directly. When appropriate, however, the JVM 108 may also request the MPU 104 to execute one or more Java bytecodes not executed or executable by the JSM 102. In addition to executing compiled Java bytecodes, the MPU 104 also may execute non-Java instructions.

One or more of the Java applications 118 may read data from and write data to the device memory 126 during execution. Because the device memory 126 is not mapped into the data memory space of either the JSM 102 or the MPU 104, the applications executing on these processors cannot access the elements of the device memory 126 using the data address modes of the processors. The system 100 may comprise embodiments of one or more methods for accessing the device memory 126 to facilitate coding of such indirect memory accesses in the Java applications 118. Each of these methods comprises defining a Java class representing the device memory and using one or more euid's identifying the elements of the device memory 126 for accessing those elements. In one such method, the Java native APIs 124 comprise one or more classes and methods that may be used in the Java applications 118 to read and write elements of the device memory 126. Embodiments of such API classes and methods are further described herein in reference to FIG. 3. In two other methods, the field or array access opcodes implemented by the JVM 108 are extended to permit the Java applications 118 to access the elements of the device memory 126 using field operations or array operations. Each of these methods is described in more detail in reference to FIGS. 4 and 5 respectively.

The MPU 104 may also host an operating system ("O/S") (not specifically shown) which performs various functions such as system memory management, the system task management that schedules the software aspects of the JVM 108 and most or all other native tasks running on the system, management of the display 114, and receiving input from various devices 116. Java code may be used to perform any one of a variety of applications such as multimedia, games or web based applications in the system 100, while non-Java code, which may comprise the O/S and other native applications, may still run on the system on the MPU 104.

Java bytecodes perform stack-based operations. For example, an "IADD" (integer add) Java opcode pops two integers off the top of the stack, adds them together, and pushes the sum back on the stack. A "simple" opcode is one in which the JSM 102 may perform an immediate operation either in a single cycle (e.g., an IADD opcode) or in several cycles (e.g., "DUP2_X2"). A "complex" opcode is one in which several memory accesses may be required to be made within the JVM data structure for various verifications (e.g., NULL pointer, array boundaries).

A JSM processor 102 in accordance with embodiments of the invention may execute, in addition to the Java bytecodes, a second instruction set other than Java bytecodes. In some embodiments, the second instruction set may comprise register-based and memory-based operations rather than stack-based operations. This second instruction set complements the Java instruction set and, accordingly, may be referred to as a complementary instruction set architecture ("C-ISA"). By complementary, it is meant that some complex Java bytecodes may be replaced by a "micro-sequence" comprising C-ISA instructions. The execution of Java code may thus be made more efficient and run faster by replacing some opcodes by more efficient micro-sequences of C-ISA instructions. As such, JSM 102 comprises a stack-based architecture for efficient and accelerated execution of Java bytecodes, combined with a register-based architecture for executing register and memory based micro-sequences of C-ISA instructions.

Figure 2:
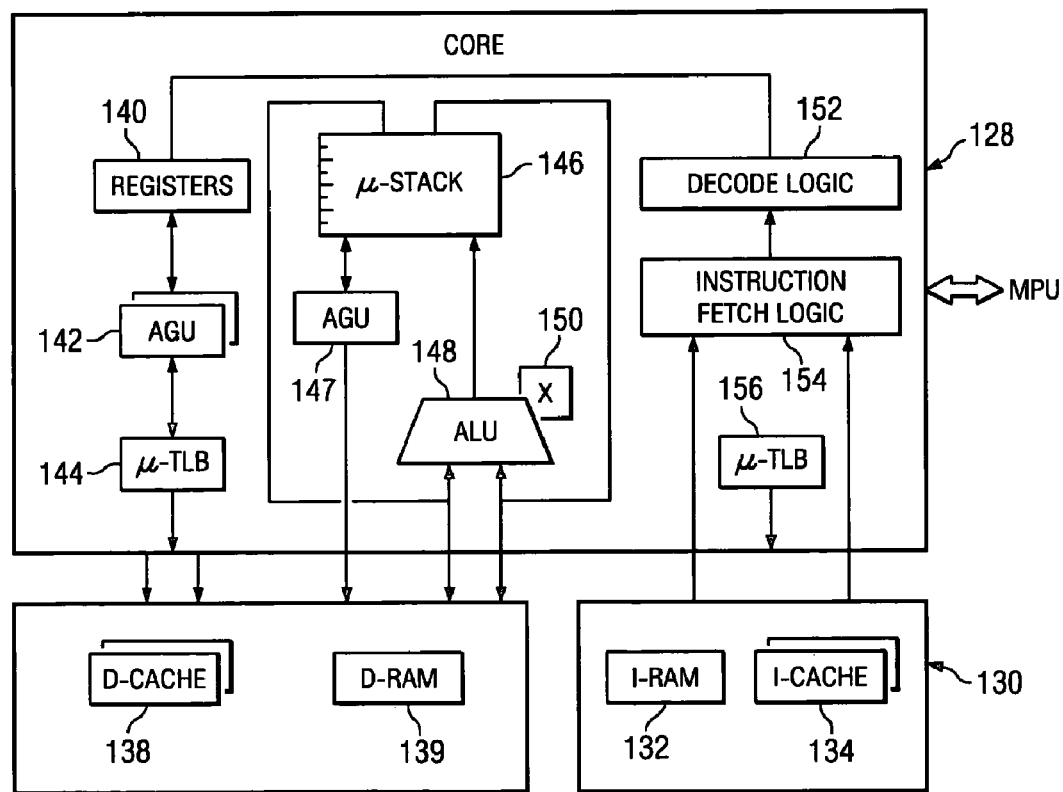
FIG. 2 shows a block diagram of the JSM of FIG. 1 in accordance with embodiments of the invention.

FIG. 2 shows an illustrative block diagram of the JSM 102. As shown, the JSM comprises a core 128 coupled to data storage 136 and instruction storage 130. The components of the core 128 preferably comprise a plurality of registers 140, address generation units ("AGUs") 142 and 147, micro-translation lookaside buffers (micro-TLBs) 144 and 156, a multi-entry micro-stack 146, an arithmetic logic unit ("ALU") 148, a multiplier 150, decode logic 152, and instruction fetch logic 154. Data pointed to by operands of opcodes may be retrieved from data storage 136 or from the micro-stack 146, and processed by the ALU 148. Instructions may be fetched from instruction storage 130 by fetch logic 154 and decoded by decode logic 152. The AGUs 142 may be used to calculate addresses for micro-sequence instructions based, at least in part, on data contained in the registers 140. AGU 147 couples to the micro-stack 146 and may manage overflow and underflow conditions in the micro-stack 146. The micro-TLBs 144 and 156 perform the function of a cache for the address translation and memory protection information bits that are under the control of the operating system running on the MPU 104.

Java bytecodes may pop data from and push data onto the micro-stack 146, which micro-stack 146 preferably comprises a plurality of gates in the core 128 of the JSM 102. The micro-stack 146 preferably comprises the top n entries of a larger stack that is implemented in data storage 136. Although the value of n may be vary in different embodiments, in accordance with at least some embodiments the size n of the micro-stack may be the top eight entries in the larger, memory-based stack. By implementing the micro-stack 146 hardware in the core 128 of the processor 102, access to the data contained in the micro-stack 146 is very fast, although any particular access speed is not a limitation on this disclosure.

ALU 148 adds, subtracts, and shifts data. The multiplier 150 may be used to multiply two values together in one or more cycles. The instruction fetch logic 154 fetches instructions from instruction storage 130, which instructions may be decoded by decode logic 152. Because the JSM 102 is configured to process instructions from at least two instruction sets, the decode logic 152 comprises at least two modes of operation, one mode for each instruction set. As such, the decode logic unit 152 may comprise a Java mode in which Java bytecodes may be decoded, and a C-ISA mode in which micro-sequences of C-ISA instructions may be decoded.

The data storage 136 comprises data cache ("D-cache") 138 and data random access memory ("D-RAM") 139. The stack (excluding the micro-stack 146), arrays and non-critical data may be stored in the D-cache 138, while Java local variables, critical data and non-Java variables (e.g., C, C++) may be stored in D-RAM 139. The instruction storage 130 may comprise instruction RAM ("I-RAM") 132 and instruction cache ("I-CACHE") 134. The I-RAM 132 may be used for opcodes or micro-sequences, and the I-CACHE 134 may be used to store other types of Java bytecode and mixed Java/C-ISA instructions.

Figures 5, 6:
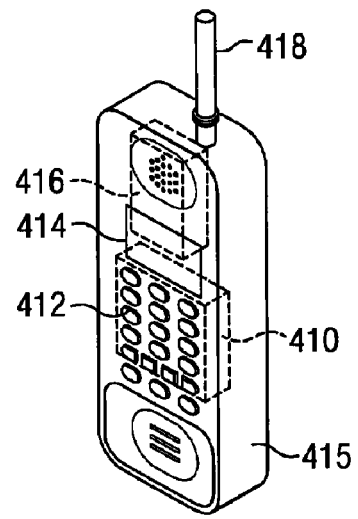

FIGS. 3, 4, and 5 present example source code illustrating three methods for accessing indirect memory from a Java application in accordance with embodiments of the invention. The source code is presented by way of example only. Other implementations are possible and fall within the scope of this disclosure. The source code examples of FIGS. 3, 4, and 5 assume an indirect memory having two addressable elements for simplicity of explanation. Other embodiments may be directed to devices having more memory elements and/or different native code sequences for accessing the memory elements. In FIGS. 3 and 4, the identifiers element1Euid and element2Euid are element unique identifiers ("euids") that represent the indirect memory "address" of these two memory elements (see lines 21-22 of FIG. 3 and lines 7-8 of FIG. 4). In FIG. 5, the identifier memoryEuidBase represents the euid of the first element of a contiguous range of indirect memory elements, and the identifiers element1Offset and element2Offset represent an index or offset of the respective elements in the contiguous range of indirect memory elements (see lines 6 and 15-16 of FIG. 5).

FIG. 3 illustrates a method for accessing indirect memory using native APIs comprised in the Java native APIs 124. These native APIs implement the code sequences needed to read and write the indirect memory elements so the each Java application does not need to implement them. Instead, a Java application may use Java methods to read and write the indirect memory element.

In the example of FIG. 3, two native methods are illustrated, a read method (lines 1-4) and a write method (lines 6-9). These native methods are declared to be static to simplify access to the methods. In alternate embodiments, these methods may not be static. Note that the signature of the native methods is matched to the element characteristics of the indirect memory (e.g., int, char, short, etc.). Each of these native methods is implemented in non-Java code that performs the actual read or write operation (i.e., the "IN" instruction in line 3 and the "OUT" instruction in line 8). A Java class, IndirectMemory, representing the indirect memory is also provided (lines 11-15) that comprises Java methods that may be used in a Java application to read and write the indirect memory elements. As is illustrated in Class User (lines 17-24), a Java application may read or write an element of the IndirectMemory class by invoking the appropriate method of the class, passing the euid of the desired element as a parameter (lines 21-22). While this example shows the euid as a single parameter that corresponds to a portAddress of an I/O device, in other embodiments, the euid may be more complex and may comprise multiple parameters of the read and write methods.

FIG. 4 illustrates a method for accessing indirect memory using Java getfield and putfield opcodes. Static fields are mapped onto each of the elements of an indirect memory and the implementation of the getfield and putfield opcodes in the JVM 108 is extended to recognize an indirect memory access. When a getfield or putfield operation is done on a field mapped on an indirect memory element, the JVM 108 generates the code sequence needed to access the element.

In the example of FIG. 4, a class, IndirectMemory, is defined to represent the indirect memory (lines 1-10). In this class, the variables element1 and element2 are defined to represent the indirect memory elements (lines 3-4). Note that the types of the variables are matched to the element characteristics of the indirect memory represented by the class. A constructor is provided that maps each of these variables onto their respective indirect memory elements when the class is instantiated (lines 5-9). Note that the euids are used in this mapping operation. As is illustrated in class User (lines 12-21), a Java application may access the indirect memory by instantiating an indirectMemory object of type IndirectMemory (line 17). The application may then read and write the elements of the indirect memory using Java variable operations (lines 18-19). These variable operations are translated to getfield and putfield operations as appropriate when the source code is compiled.

FIG. 5 illustrates a method for accessing indirect memory using a Java array. An array is mapped onto the indirect memory and the implementations of the array access opcodes (i.e., aaload, aastore, caload, castore, iaload, iastore, etc.) in the JVM 108 are extended to recognize an indirect memory access. When an array access operation is executed on an array mapped on an indirect memory, the JVM 108 generates the code sequence needed to access the element represented by the referenced array entry.

In the example of FIG. 5, a class, IndirectMemory, is defined to represent the indirect memory (lines 1-8). In this class, an array IndirectMemory is defined to represent a contiguous range of indirect memory elements (line 3). Note that the type of the array is matched to the element characteristics of the indirect memory represented by the class. A constructor is provided that maps the elements of the array onto their respective indirect memory elements when the class is instantiated (lines 4-7). Each indirect memory element may then be accessed using an array index that corresponds to that memory elements relative position in the contiguous range. In this example, memoryEuidBase represents the euid of the first element of a contiguous range of memory locations in the indirect memory. As is illustrated in class User (lines 10-19), a Java application may access the indirect memory by instantiating an indirectMemory object of type IndirectMemory (line 15) and then using array operations to read and write elements of the indirect memory (lines 16-17). These array operations are translated to array opcodes as appropriate when the source code is compiled.

System 100 may be implemented as a mobile device such as that shown in FIG. 6. As shown, the mobile device comprises an integrated keypad 412 and display 414. The JSM processor 102 and MPU processor 104 and other components may be comprised in electronics package 410 connected to the keypad 412, display 414, and radio frequency ("RF") circuitry 416. The RF circuitry 416 may be connected to an antenna 418.

While the various embodiments of the invention have been shown and described, modifications thereof can be made by one skilled in the art without departing from the spirit and teachings of the invention. The embodiments described herein are illustrative only, and are not intended to be limiting. Many variations and modifications of the invention disclosed herein are possible and are within the scope of the invention. Accordingly, the scope of protection is not limited by the description set out above. Each and every claim is incorporated into the specification as an embodiment of the present invention.

What is claimed is:

1. A storage medium comprising Java application software that performs one or more operations on an indirect memory, the software comprising:
   Java instructions that create an instance of a Java class representing the indirect memory, wherein the indirect memory is memory of a device that is not mapped into a memory space of a processor executing the Java application software;
   Java instructions that access a memory element of the indirect memory, wherein the indirect memory comprises a contiguous range of memory elements comprising the memory element;
   the Java instructions that create comprise Java instructions that map an array onto the contiguous range, wherein the Java instructions that map use an element unique identifier of an initial memory element of the contiguous range; and
   the Java instructions that access comprise Java instructions that use a Java array operation to access the memory element using an array index corresponding to a relative location of the memory element in the contiguous range.

2. The storage medium of claim 1, wherein the Java array operation is translated to a Java array bytecode that is extended in a Java virtual machine to generate a code sequence that accesses the memory element in the indirect memory.

3. A method for performing one or more operations on a indirect memory from Java application software executing on a Java virtual machine (JVM) executing on a processor, the method comprising:
   creating an instance of a Java class representing the indirect memory, wherein the indirect memory is memory of a device that is not mapped into a memory space of the processor;
   accessing a memory element of the indirect memory using Java instructions, wherein the indirect memory comprises a contiguous range of memory elements comprising the memory element;
   creating an instance comprises mapping an array onto the contiguous range using an element unique identifier of an initial memory element of the contiguous range; and
   accessing a memory element comprises using a Java array operation to access the memory element with an array index corresponding to a relative location of the memory element in the contiguous range.

4. The method of claim 3, wherein the Java array operation is translated to a Java array bytecode that is extended in the JVM to generate a code sequence that accesses the memory element in the indirect memory.

5. A system, comprising:
   a processor:
   an indirect memory, wherein the indirect memory is memory of a device coupled to the processor, wherein the memory is not mapped into a memory space of the processor;
   a Java virtual machine (JVM) configured to execute on the processor; and
   a Java application configured to execute on the JVM;
   wherein an instance of a Java class is created to represent the indirect memory; and
   wherein the Java application is configured to access a memory element of the indirect memory using Java instructions, wherein:
      the indirect memory comprises a plurality of contiguous memory elements, the contiguous memory element's comprising the memory element;
      the JVM comprises a Java array bytecode configured to access the memory element;
      the Java class is configured to map an array onto the plurality of contiguous memory elements using an element unique identifier of an initial memory element of the plurality of contiguous memory elements; and
      the Java application is configured to use a Java array operation to access the memory element, wherein an array index corresponding to a relative location of the memory element in the plurality of contiguous memory elements is used, wherein the Java array operation is translated to the Java array bytecode by a compiler.

6. The system of claim 5, wherein the Java array bytecode generates a code sequence that accesses the memory element in the indirect memory.

7. The system of claim 5, wherein the system comprises a mobile device.

* * * * *